US011949677B2

(12) United States Patent
Lam

(10) Patent No.: US 11,949,677 B2
(45) Date of Patent: *Apr. 2, 2024

(54) RESOURCE ACCESS BASED ON AUDIO SIGNAL

(71) Applicant: Microsoft Technology Licensing, LLC, Redmond, WA (US)

(72) Inventor: Wing Hong Michael Lam, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/392,445

(22) Filed: Apr. 23, 2019

(65) Prior Publication Data

US 2020/0344231 A1 Oct. 29, 2020

(51) Int. Cl.
*H04L 9/40* (2022.01)
*G06F 3/16* (2006.01)
(Continued)

(52) U.S. Cl.
CPC .............. *H04L 63/10* (2013.01); *G06F 3/167* (2013.01); *G08C 23/02* (2013.01); *H04L 63/08* (2013.01);
(Continued)

(58) Field of Classification Search
None
See application file for complete search history.

(56) References Cited

U.S. PATENT DOCUMENTS

| 5,771,349 A * | 6/1998 | Picazo, Jr. ................ H04L 9/40 |
| | | 726/21 |
| 6,252,964 B1 * | 6/2001 | Wasilewski ...... H04N 21/23476 |
| | | 380/282 |

(Continued)

FOREIGN PATENT DOCUMENTS

| CA | 2248240 A1 | 12/1997 |
| CA | 2401717 A1 | 9/2001 |

(Continued)

OTHER PUBLICATIONS

Sha et al "The Design of Access Control System Based on Dynamic Audio Token," IEEE, ICALIP 2016, pp. 106-110 (Year: 2016).*

(Continued)

*Primary Examiner* — Luu T Pham
*Assistant Examiner* — James J Wilcox
(74) *Attorney, Agent, or Firm* — Workman Nydegger

(57) ABSTRACT

A resource server system granting to users access to a resource based on the very fact that the users' computing systems can demonstrate that they heard an audio signal. Specifically, the resource server system detects receipt of a message from a client computing system, and interprets the message as representing that the client computing system heard an audio signal. In response, the resource server system grants a user of the client computing system access to the resource. This may be performed for multiple client computing systems that each demonstrate that they heard the audio signal. Thus, the principles described herein allow for the granting of access to resources to other computing systems within the audible proximity of a computing system that transmitted the audio signal.

20 Claims, 6 Drawing Sheets

(51) Int. Cl.
*G08C 23/02* (2006.01)
*H04W 12/65* (2021.01)
*H04W 12/084* (2021.01)

(52) U.S. Cl.
CPC .......... *H04L 63/107* (2013.01); *H04W 12/65* (2021.01); *H04L 63/18* (2013.01); *H04W 12/084* (2021.01)

(56) References Cited

U.S. PATENT DOCUMENTS

| | | | | |
|---|---|---|---|---|
| 6,292,568 B1* | 9/2001 | Akins, III | .......... | H04N 21/4405 348/E7.075 |
| 6,424,717 B1* | 7/2002 | Pinder | .................. | H04L 63/123 348/E7.075 |
| 6,427,140 B1* | 7/2002 | Ginter | .................. | H04L 9/0838 713/193 |
| 6,496,936 B1* | 12/2002 | French | .................... | G06F 21/33 705/26.35 |
| 6,510,519 B2 | 1/2003 | Wasilewski | ........... | H04L 63/045 713/168 |
| 6,529,885 B1* | 3/2003 | Johnson | .................. | G06Q 30/00 705/26.4 |
| 6,560,340 B1* | 5/2003 | Akins, III | ................ | H04L 63/04 348/E7.075 |
| 7,168,094 B1* | 1/2007 | Fredell | ................ | H04L 63/0815 726/28 |
| 7,185,360 B1* | 2/2007 | Anton, Jr. | ............. | H04L 63/083 709/227 |
| 7,188,252 B1* | 3/2007 | Dunn | .................... | H04L 63/102 713/193 |
| 7,269,853 B1* | 9/2007 | Dunn | .................... | H04L 63/102 726/27 |
| 7,454,785 B2* | 11/2008 | Kerstens | ................ | H04L 67/08 713/168 |
| 7,543,329 B2* | 6/2009 | Viets | .................... | H04L 63/105 726/2 |
| 7,546,630 B2* | 6/2009 | Tabi | ........................ | H04L 63/08 726/2 |
| 7,603,565 B2* | 10/2009 | Baird, III | ............. | H04W 12/06 726/28 |
| 7,730,523 B1* | 6/2010 | Masurkar | ............ | H04L 63/168 726/4 |
| 7,793,109 B2* | 9/2010 | Ortiz | .................. | H04L 63/0861 713/186 |
| 7,895,234 B2* | 2/2011 | Lillie | .................... | G06F 16/954 707/786 |
| 7,941,534 B2* | 5/2011 | de la Huerga | ...... | H04L 63/0853 709/227 |
| 7,961,884 B2* | 6/2011 | Edgett | .................. | H04L 63/108 380/259 |
| 8,015,253 B1* | 9/2011 | Zapata | .................... | H04L 67/06 709/219 |
| 8,166,524 B2* | 4/2012 | Sentinelli | ............ | H04L 63/0853 340/5.1 |
| 8,204,999 B2* | 6/2012 | Crosbie | .................. | G06Q 99/00 726/28 |
| 8,260,716 B2* | 9/2012 | Hoffman | ............ | G06Q 30/0225 713/168 |
| 8,589,691 B1* | 11/2013 | Hackborn | ............ | H04L 9/3263 713/176 |
| 8,621,578 B1* | 12/2013 | Blomquist | ............ | H04L 63/12 713/182 |
| 8,959,611 B1* | 2/2015 | Vincent | ................ | H04L 61/103 726/13 |
| 8,989,883 B2* | 3/2015 | Shah | ................ | G11B 20/00739 700/94 |
| 9,038,152 B1* | 5/2015 | Vazquez | ............... | H04L 63/08 726/6 |
| 9,038,170 B2* | 5/2015 | Joshi | ................... | H04L 61/4523 713/153 |
| 9,076,006 B1* | 7/2015 | Saylor | .................. | G06F 21/606 |
| 9,094,453 B2* | 7/2015 | Ady | ........................ | G10L 19/00 |
| 9,202,513 B2* | 12/2015 | Shah | ........................ | G06F 21/16 |
| 9,294,452 B1* | 3/2016 | Jakobsson | ............... | H04L 63/08 |
| 9,299,386 B2* | 3/2016 | Shah | ........................ | G10L 19/018 |
| 9,392,021 B1* | 7/2016 | Labana | .................... | H04L 63/10 |
| 9,509,674 B1* | 11/2016 | Nasserbakht | ........ | G06F 21/6218 |
| 9,514,584 B1* | 12/2016 | Burge | ........................ | G07C 9/20 |
| 9,516,015 B1* | 12/2016 | Shelton | .................. | G06F 21/46 |
| 9,531,952 B2* | 12/2016 | Snavely | .................. | G06F 3/14 |
| 9,591,148 B2* | 3/2017 | Dimitroff | .................. | G01S 3/80 |
| 9,608,970 B1* | 3/2017 | Gehret | .................. | H04L 63/062 |
| 9,729,549 B2* | 8/2017 | Davis | .................... | H04L 67/535 |
| 9,762,581 B1* | 9/2017 | Wang | .................... | H04L 63/102 |
| 9,779,232 B1* | 10/2017 | Paczkowski | ........ | H04L 63/0838 |
| 9,805,213 B1* | 10/2017 | Kragh | .................... | G06F 16/245 |
| 9,913,135 B2* | 3/2018 | Perold | .................... | H04L 9/088 |
| 9,942,349 B2* | 4/2018 | Johannsen | ............... | H04L 43/04 |
| 9,985,786 B1* | 5/2018 | Bhabbur | .................. | G06F 3/0488 |
| 9,992,241 B1* | 6/2018 | Huang | .................. | H04M 7/0027 |
| 10,069,914 B1* | 9/2018 | Smith | .................... | H04L 67/568 |
| 10,158,640 B2* | 12/2018 | Himmelstein | ........ | H04M 1/724 |
| 10,164,985 B2* | 12/2018 | Turgeman | ............ | H04L 63/1408 |
| 10,178,076 B2* | 1/2019 | Miller | .................... | H04L 9/0866 |
| 10,178,132 B2* | 1/2019 | Chahal | .................... | G06F 21/57 |
| 10,749,701 B2 | 8/2020 | Barr et al. | | |
| 10,897,465 B2* | 1/2021 | Smith | .................... | H04L 63/10 |
| 2001/0053226 A1* | 12/2001 | Akins, III | ............. | H04L 63/123 380/282 |
| 2002/0075304 A1* | 6/2002 | Thompson | ............... | H04L 67/36 715/751 |
| 2002/0112083 A1* | 8/2002 | Joshi | .................... | G06F 16/9574 707/E17.112 |
| 2002/0120599 A1* | 8/2002 | Knouse | .................. | H04L 63/102 707/E17.112 |
| 2002/0184217 A1* | 12/2002 | Bisbee | .................... | G06F 21/33 707/999.009 |
| 2003/0142641 A1* | 7/2003 | Sumner | .................. | H04W 48/18 370/328 |
| 2003/0182420 A1* | 9/2003 | Jones | ................... | H04L 63/0245 709/224 |
| 2004/0064724 A1* | 4/2004 | Himmel | .................. | H04L 63/105 713/185 |
| 2004/0249902 A1* | 12/2004 | Tadayon | .................. | G06F 16/10 709/207 |
| 2005/0193093 A1* | 9/2005 | Mathew | .................... | H04L 67/02 709/219 |
| 2005/0235148 A1* | 10/2005 | Scheidt | ............ | G06Q 20/3829 713/168 |
| 2006/0212407 A1* | 9/2006 | Lyon | .................. | G06Q 20/4014 705/71 |
| 2006/0253894 A1* | 11/2006 | Bookman | ................ | H04L 63/08 455/414.2 |
| 2007/0034691 A1* | 2/2007 | Davis | .................. | G06Q 20/3278 235/382 |
| 2007/0136589 A1* | 6/2007 | Magdi | .................... | H04L 9/3271 713/168 |
| 2007/0180493 A1* | 8/2007 | Croft | .................... | H04L 63/0428 726/2 |
| 2007/0186106 A1* | 8/2007 | Ting | .................... | H04L 63/0815 713/168 |
| 2007/0261101 A1* | 11/2007 | Thapliyal | ............ | H04L 63/104 726/2 |
| 2007/0289000 A1* | 12/2007 | Weiss | ................ | G06Q 20/40145 726/5 |
| 2008/0046984 A1* | 2/2008 | Bohmer | .................... | G06F 21/31 726/5 |
| 2008/0052541 A1* | 2/2008 | Ginter | .................... | G06F 21/51 713/193 |
| 2008/0059804 A1* | 3/2008 | Shah | .................... | H04L 63/083 726/8 |
| 2008/0120707 A1* | 5/2008 | Ramia | .................... | H04L 9/3231 726/5 |
| 2008/0229400 A1* | 9/2008 | Burke | .................. | H04L 63/0861 726/7 |
| 2008/0263652 A1* | 10/2008 | McMurtry | ............ | G06F 21/335 726/9 |
| 2009/0191846 A1* | 7/2009 | Shi | .................... | H04L 63/0861 455/411 |

(56) References Cited

U.S. PATENT DOCUMENTS

| | | | |
|---|---|---|---|
| 2009/0198682 A1* | 8/2009 | Buehler | G06F 16/335 |
| 2009/0210541 A1* | 8/2009 | Chandolu | H04L 63/104 709/229 |
| 2009/0282258 A1* | 11/2009 | Burke | G06F 21/6281 713/184 |
| 2009/0300731 A1* | 12/2009 | Birck | H04L 63/102 726/5 |
| 2010/0042846 A1* | 2/2010 | Trotter | H04L 63/104 235/375 |
| 2010/0077448 A1* | 3/2010 | Contino | G06F 21/78 709/229 |
| 2010/0125605 A1* | 5/2010 | Nair | A61K 31/194 707/E17.115 |
| 2010/0169262 A1* | 7/2010 | Kenedy | H04W 12/082 706/50 |
| 2010/0194571 A1* | 8/2010 | Ortiz | H04L 63/0861 340/5.82 |
| 2010/0223471 A1* | 9/2010 | Fresko | H04L 63/12 713/176 |
| 2010/0281526 A1* | 11/2010 | Raghavan | H04L 63/083 726/7 |
| 2011/0145593 A1* | 6/2011 | Auradkar | H04L 9/0833 713/189 |
| 2011/0238192 A1 | 9/2011 | Shah et al. | |
| 2011/0274051 A1* | 11/2011 | Vikberg | H04W 8/18 370/328 |
| 2011/0305337 A1* | 12/2011 | Devol | G06F 21/552 726/16 |
| 2011/0314145 A1* | 12/2011 | Raleigh | H04W 48/16 709/224 |
| 2011/0314530 A1* | 12/2011 | Donaldson | H04L 9/3271 726/7 |
| 2012/0019361 A1* | 1/2012 | Ben Ayed | H04W 12/068 340/5.83 |
| 2012/0019379 A1* | 1/2012 | Ben Ayed | G06F 21/32 340/5.82 |
| 2012/0045057 A1* | 2/2012 | Brown | H04L 9/3236 380/255 |
| 2012/0086549 A1* | 4/2012 | Barnes, Jr. | G06Q 20/04 340/5.61 |
| 2012/0198531 A1 | 8/2012 | Ort et al. | |
| 2012/0271442 A1* | 10/2012 | Shah | G10L 19/018 700/94 |
| 2013/0066633 A1 | 3/2013 | Krishnan | |
| 2013/0106976 A1* | 5/2013 | Chu | H04N 7/15 348/14.02 |
| 2013/0139222 A1* | 5/2013 | Kirillin | H04L 67/02 726/4 |
| 2013/0223696 A1* | 8/2013 | Azar | G06V 40/16 382/118 |
| 2013/0318589 A1* | 11/2013 | Ford | H04L 63/10 726/7 |
| 2013/0347129 A1* | 12/2013 | Samuelsson | H04L 9/3231 726/28 |
| 2014/0006025 A1* | 1/2014 | Krishnan | G10L 17/00 704/246 |
| 2014/0020072 A1* | 1/2014 | Thomas | H04L 67/10 726/7 |
| 2014/0047560 A1* | 2/2014 | Meyer | G06F 21/10 726/28 |
| 2014/0123307 A1* | 5/2014 | Jung | G06F 21/60 726/27 |
| 2014/0143831 A1* | 5/2014 | Fieweger | H04L 63/0861 726/3 |
| 2014/0156053 A1* | 6/2014 | Mahdavi | G06Q 50/04 700/119 |
| 2014/0157370 A1* | 6/2014 | Plattner | H04L 63/06 726/4 |
| 2014/0304836 A1* | 10/2014 | Velamoor | G06F 21/6209 726/28 |
| 2014/0309867 A1* | 10/2014 | Ricci | G06Q 30/0645 701/36 |
| 2014/0337930 A1* | 11/2014 | Hoyos | G06F 21/34 726/4 |
| 2015/0015365 A1* | 1/2015 | Ortiz | G07C 9/25 340/5.52 |
| 2015/0033297 A1* | 1/2015 | Sanso | H04L 63/126 726/5 |
| 2015/0067786 A1* | 3/2015 | Fiske | H04W 12/06 726/4 |
| 2015/0106897 A1* | 4/2015 | Davis | H04L 63/083 726/7 |
| 2015/0135300 A1* | 5/2015 | Ford | G06Q 50/18 726/11 |
| 2015/0140964 A1 | 5/2015 | Horton | |
| 2015/0163206 A1* | 6/2015 | McCarthy | H04L 63/104 726/4 |
| 2015/0180875 A1* | 6/2015 | Kay | H04W 12/128 726/4 |
| 2015/0206139 A1* | 7/2015 | Lea | G06Q 20/02 705/44 |
| 2015/0207795 A1* | 7/2015 | Wentz | G06F 21/44 726/4 |
| 2015/0264567 A1* | 9/2015 | Sensharma | G06V 40/172 455/411 |
| 2015/0287416 A1* | 10/2015 | Brands | H04L 9/3231 704/273 |
| 2015/0310188 A1* | 10/2015 | Ford | H04L 63/101 726/28 |
| 2015/0331660 A1* | 11/2015 | Kalampoukas | G10L 25/27 700/94 |
| 2015/0347734 A1* | 12/2015 | Beigi | H04L 9/3268 726/28 |
| 2015/0349966 A1* | 12/2015 | Dimitrakos | H04L 63/0838 713/168 |
| 2015/0358790 A1* | 12/2015 | Nasserbakht | G06F 21/32 726/19 |
| 2015/0363986 A1* | 12/2015 | Hoyos | G07C 9/00571 340/5.61 |
| 2016/0006744 A1* | 1/2016 | Du | H04L 67/52 726/4 |
| 2016/0021117 A1* | 1/2016 | Harmon | H04L 63/20 726/1 |
| 2016/0065571 A1* | 3/2016 | Hoyos | H04L 63/0428 713/168 |
| 2016/0072803 A1* | 3/2016 | Holz | H04W 12/06 726/7 |
| 2016/0080943 A1* | 3/2016 | Ives-Halperin | G06Q 10/02 713/168 |
| 2016/0094543 A1* | 3/2016 | Innes | H04L 63/0823 726/6 |
| 2016/0110563 A1* | 4/2016 | Dravneek | G06Q 30/0201 726/1 |
| 2016/0142413 A1* | 5/2016 | Diep | H04L 67/52 726/4 |
| 2016/0149956 A1* | 5/2016 | Birnbaum | G06F 21/10 726/1 |
| 2016/0203315 A1* | 7/2016 | Wentz | G06F 21/34 726/4 |
| 2016/0255189 A1* | 9/2016 | Hodge | H04M 7/1295 379/88.02 |
| 2016/0285866 A1* | 9/2016 | Allen | G06N 3/08 |
| 2016/0294876 A1* | 10/2016 | Lawrence | H04L 63/08 |
| 2016/0337346 A1* | 11/2016 | Momchilov | G06F 21/34 |
| 2017/0011179 A1* | 1/2017 | Arshad | H04L 63/102 |
| 2017/0034160 A1* | 2/2017 | Brands | H04M 3/56 |
| 2017/0039351 A1* | 2/2017 | Bangole | H04W 4/48 |
| 2017/0041296 A1* | 2/2017 | Ford | G06F 21/64 |
| 2017/0048244 A1* | 2/2017 | Loughlin-McHugh | G06V 40/171 |
| 2017/0093870 A1* | 3/2017 | Meyer | H04L 63/08 |
| 2017/0111350 A1* | 4/2017 | Volini | H04L 63/08 |
| 2017/0118165 A1* | 4/2017 | Kumar | G06F 16/9537 |
| 2017/0118221 A1* | 4/2017 | Hannel | H04L 63/0471 |
| 2017/0163647 A1* | 6/2017 | Cernoch | G06F 21/44 |
| 2017/0279799 A1* | 9/2017 | Baltzer | H04L 63/0861 |
| 2017/0331809 A1* | 11/2017 | Feng | G06Q 20/3276 |
| 2017/0332238 A1* | 11/2017 | Bansal | H04L 67/125 |

(56) References Cited

U.S. PATENT DOCUMENTS

| | | | |
|---|---|---|---|
| 2017/0346756 A1 | 11/2017 | Bullock et al. | |
| 2017/0346830 A1* | 11/2017 | Goldfarb | H04L 63/104 |
| 2017/0346851 A1* | 11/2017 | Drake | H04L 9/0838 |
| 2018/0007059 A1* | 1/2018 | Innes | G06F 21/6218 |
| 2018/0007087 A1* | 1/2018 | Grady | G06F 21/554 |
| 2018/0026972 A1* | 1/2018 | Nordstrom | H04L 63/0846 726/5 |
| 2018/0034824 A1* | 2/2018 | Maycotte | H04L 63/102 |
| 2018/0053126 A1* | 2/2018 | Weaver | G06Q 10/067 |
| 2018/0082220 A1* | 3/2018 | Bombacino | G06Q 10/02 |
| 2018/0103030 A1* | 4/2018 | Einberg | G06F 1/163 |
| 2018/0144748 A1* | 5/2018 | Leong | G06F 3/165 |
| 2018/0212960 A1* | 7/2018 | Sandeep | G09C 1/00 |
| 2018/0234408 A1* | 8/2018 | Bransom | H04L 9/3297 |
| 2018/0255053 A1* | 9/2018 | Bhabbur | H04L 9/3228 |
| 2018/0288060 A1* | 10/2018 | Jackson | H04L 63/107 |
| 2018/0288095 A1* | 10/2018 | Shaw | H04L 67/12 |
| 2018/0302390 A1* | 10/2018 | Beecham | H04L 63/0281 |
| 2018/0359244 A1* | 12/2018 | Cockerill | H04L 63/12 |
| 2018/0373887 A1* | 12/2018 | Smith | G06F 21/6227 |
| 2019/0044942 A1* | 2/2019 | Gordon | H03M 13/3972 |
| 2019/0044951 A1* | 2/2019 | Zivkovic | H04L 67/535 |
| 2019/0050554 A1* | 2/2019 | Fiske | H04L 63/08 |
| 2019/0069062 A1* | 2/2019 | Taniguchi | H04R 3/005 |
| 2019/0163896 A1* | 5/2019 | Balaraman | H04L 9/0637 |
| 2019/0164165 A1* | 5/2019 | Ithabathula | G06F 21/34 |
| 2019/0182176 A1* | 6/2019 | Niewczas | G10L 17/24 |
| 2019/0199704 A1* | 6/2019 | Pujic | H04L 63/0823 |
| 2019/0243956 A1* | 8/2019 | Sheets | G06F 16/903 |
| 2019/0246170 A1* | 8/2019 | Sreekanth | H04N 21/4753 |
| 2019/0253413 A1 | 8/2019 | Wang et al. | |
| 2019/0253431 A1* | 8/2019 | Atanda | G06F 21/62 |
| 2020/0042837 A1* | 2/2020 | Skinner | G06F 18/217 |
| 2020/0145408 A1* | 5/2020 | Komperla | H04L 9/3231 |
| 2020/0287897 A1* | 9/2020 | Jha | H04L 63/0861 |
| 2020/0344241 A1 | 10/2020 | Lam | |
| 2021/0250354 A1* | 8/2021 | Parikh | G06F 21/62 |

FOREIGN PATENT DOCUMENTS

| | | | |
|---|---|---|---|
| CA | 2401721 A1 | 9/2001 | |
| CN | 101627627 A | 1/2010 | |
| CN | 101867574 A | 10/2010 | |
| CN | 102801778 A | 11/2012 | |
| CN | 106445448 A | 2/2017 | |
| CN | 107945799 A | 4/2018 | |
| WO | 2018096772 A1 | 5/2018 | |
| WO | WO-2019216969 A1 * | 11/2019 | H04L 63/102 |

OTHER PUBLICATIONS

Renals et al "Audio Information Access from Meeting Rooms," IEEE, ICASSP 2003, pp. 744-747 (Year: 2003).*

"International Search Report & Written Opinion issued in PCT Application No. PCT/US20/025577", dated Jun. 16, 2020, 9 Pages. (MS# 406188-WO-PCT).

"Final Office Action Issued in U.S. Appl. No. 16/392,392", dated Apr. 26, 2021, 14 Pages. (MS# 406219-US-NP).

"Non Final Office Action Issued in U.S. Appl. No. 16/392,392", dated Oct. 9, 2020, 11 Pages. (MS# 406219-US-NP).

Lowensohn, Josh, "Passpack now lets you securely share your log-ins", Retrieved From: https://www.cnet.com/news/passpack-now-lets-you-securely-share-your-log-ins/, May 19, 2009, 3 Pages.

"International Search Report and Written Opinion Issued in PCT Application No. PCT/US2020/025579", dated Jun. 15, 2020, 11 Pages. (MS# 406219-WO-PCT).

Raggett, Dave, "Getting started with HTML", Retrieved From: https://www.w3.org/MarkUp/Guide/, May 24, 2005, 6 Pages.

"Notice of Allowance Issued in U.S. Appl. No. 16/392,392", dated Dec. 14, 2021, 5 Pages. (MS# 406219-US-NP).

"Notice of Allowance Issued in U.S. Appl. No. 16/392,392", dated Jul. 14, 2021, 5 Pages. (MS# 406219-US-NP).

"First Office Action and Search Report Issued in Chinese Patent Application No. 202080030345.5", dated Nov. 25, 2022, 18 Pages. (MS# 406219-CN-PCT).

"Notice of Allowance Issued in Chinese Patent Application No. 202080030345.5", dated May 31, 2023, 9 Pages. (MS# 406219-CN-PCT).

"First Office Action and Search Report Issued in Chinese Patent Application No. 202080030682.4", dated Dec. 9, 2022, 10 Pages. (MS# 406188-CN-PCT).

"Office Action Issued in Chinese Patent Application No. 202080030682.4", dated Jul. 26, 2023, 10 Pages. (MS# 406188-CN-PCT).

"Second Office Action Issued in Chinese Patent Application No. 202080030682.4", dated May 11, 2023, 9 Pages. (MS# 406188-CN-PCT).

"Office Action Issued in Indian Patent Application No. 202147048990", dated Aug. 10, 2023, 7 Pages. (MS# 406219-IN-PCT).

"Office Action Issued in European Patent Application No. 20719319.4", dated Jul. 24, 2023, 7 Pages. (MS# 406188-EP-EPT).

"Office Action Issued in European Patent Application No. 20719320.2", dated Jul. 25, 2023, 6 Pages. (MS# 406219-EP-EPT).

"Office Action Issued in European Patent Application No. 20719320.2", dated Aug. 8, 2023, 8 Pages. (MS# 406219-EP-EPT).

Li-Qun, et al., "Web Information Resources Storage Grid Based on Knowledge Space Model", In Journal of Computer Engineering and Application, Sep. 1, 2006, 6 Pages.

U.S. Appl. No. 16/392,392, filed Apr. 23, 2019.

"Office Action Issued in Indian Patent Application No. 202147049014", dated Sep. 6, 2023, 6 Pages. (MS# 406188-IN-PCT).

Office Action Received for European Application No. 20719320.2, dated Jan. 16, 2024, 6 pages.

* cited by examiner

RESOURCE ACCESS BASED ON AUDIO SIGNAL

BACKGROUND

Human beings are a unique species in our ability to communicate one with another. Our ability to effectively share information and mutually exchange ideas contributes to almost every aspect of the advancement and happiness of humankind. Relationships are strengthened. Technological achievement is accelerated. Knowledge and wisdom can be passed from one generation or person to another. We learn from the perspectives, experiences, and knowledge of others. We work more efficiently and collaboratively.

Notwithstanding, human beings are imperfect at communicating, and thus ideas are sometimes lost, or misunderstandings can occur. Thus, we sometimes fall short of our full potential. Computing and network technologies provide additional avenues for sharing information and ideas, thereby increasing the available modalities of communication and information sharing. For instance, we can now participate in and record online meetings, share data, collaborate on documents and projects passing control back and forth, draw on electronic whiteboards, and so forth. In order to do that, it is necessary to share resources of various types. For some types of communication, it is further required to gather all participants into a common computer-enabled workspace.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a resource server computing system granting to users access to a resource based on the very fact that the users' computing systems can demonstrate that they heard an audio signal. Specifically, the resource server computing system detects receipt of a message from a client computing system, and interprets the message as representing that the client computing system heard an audio signal. In response, the resource server computing system grants a user of the client computing system access to the resource. This may be performed for multiple client computing systems that each demonstrate that they heard the audio signal. The computing system that transmitted the audio signal may have previously coordinated with the resource server computing system that any client computing system that demonstrates that they have heard this audio signal may have access to the resource. Thus, the principles described herein allow for the granting of access to resources to other computing systems within the audible proximity of a computing system that transmitted the audio signal.

The user experience associated with the granting of access to the resource is simplified greatly. The user of the transmitting computing system simply triggers the transmitting computing system to send the audio signal, where that user need not be concerned with the mechanisms that are used behind the scenes to formulate and send that audio signal. The process is simplified for the user of the receiving computing system as well. That user merely makes sure that their microphone is enabled, and then simply waits a few moments for the resource server computing system to grant access by virtue of their merely being in the audible presence of the transmitting computing system. Thus, the principles described herein make it much more convenient to share information and communicate one with another using additional communication modalities offered by computing and network technologies.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
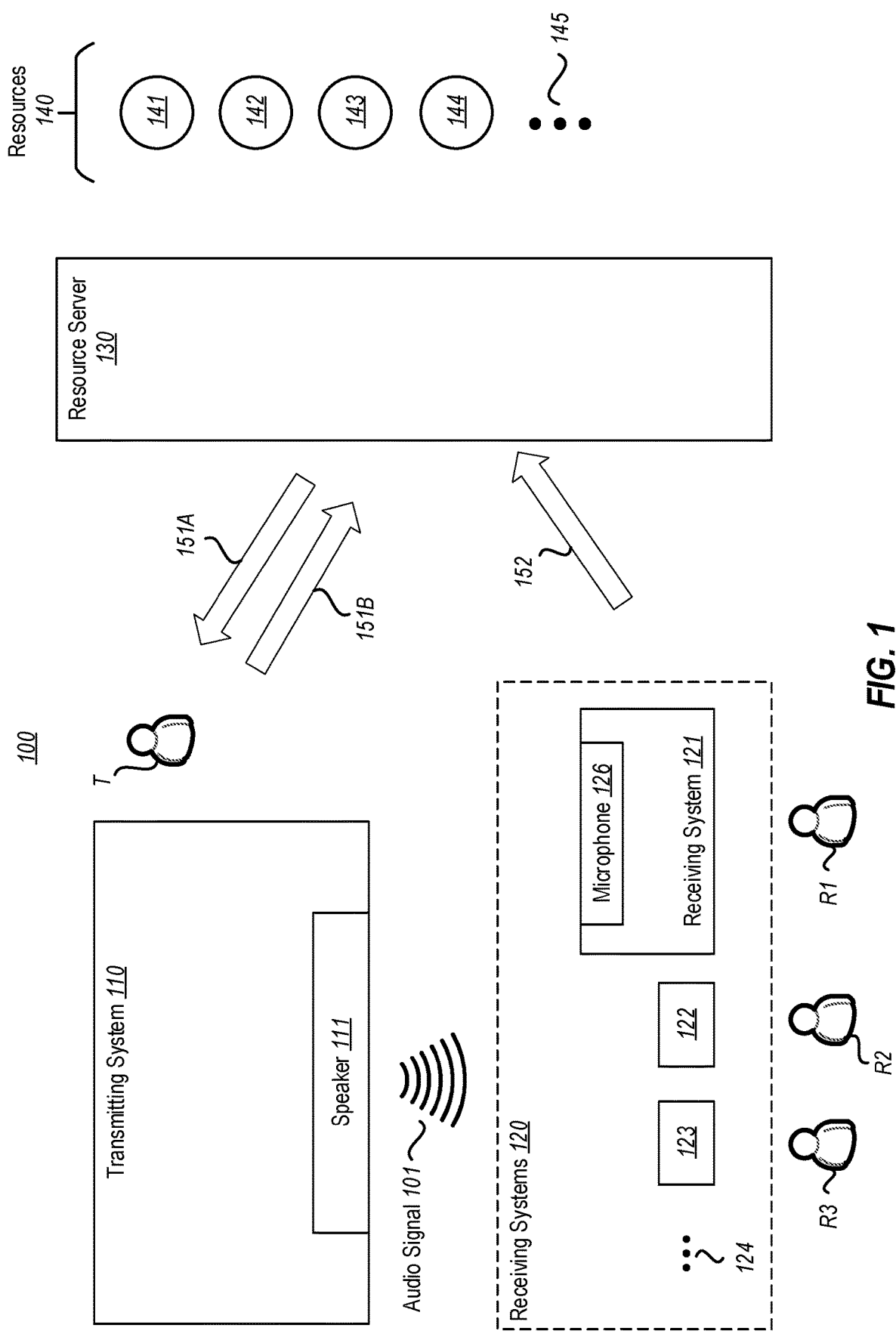
FIG. 1 illustrates a network environment in which the principles described herein may be employed, which includes a transmitting computing system that transmits an audio signal, receiving computing systems that receive the audio signal, and a resource server computing system that grants access to resources based on the receiving computing systems demonstrating that they received the audio signal.

At least some embodiments described herein relate to a resource server computing system granting to users access to a resource based on the very fact that the users' computing systems can demonstrate that they heard an audio signal. Specifically, the resource server computing system detects receipt of a message from a client computing system, and interprets the message as representing that the client computing system heard an audio signal. In response, the resource server computing system grants a user of the client computing system access to the resource. This may be performed for multiple client computing systems that each demonstrate that they heard the audio signal. The computing system that transmitted the audio signal may have previously coordinated with the resource server computing system that any client computing system that demonstrates that they have heard this audio signal may have access to the resource. Thus, the principles described herein allow for the granting of access to resources to other computing systems within the audible proximity of a computing system that transmitted the audio signal.

The user experience associated with the granting of access to the resource is simplified greatly. The user of the transmitting computing system simply triggers the transmitting computing system to send the audio signal, where that user need not be concerned with the mechanisms that are used behind the scenes to formulate and send that audio signal. The process is simplified for the user of the receiving computing system as well. That user merely makes sure that their microphone is enabled, and then simply waits a few moments for the resource server computing system to grant access by virtue of their merely being in the audible presence of the transmitting computing system. Thus, the principles described herein make it much more convenient to share information and communicate one with another using additional communication modalities offered by computing and network technologies.

The principles described herein enable an endless variety of user experiences not now possible. For instance, a professor might instruct the students in the classroom to enable the microphones on their personal devices, so that the professor's device can emit a sound that causes the students to be able to access online interactive study aids for the semester. An employee of a corporation may grant guest wi-fi access to visitors currently in the same room by emitting a sound from the employee's portable device. A network administrator might grant printer access or a network drive by issuing a sound from a portable device, which is received by employee workstations within hearing range. Individuals within a room may be seamlessly admitted into an online meeting or workspace. The possibilities are limitless.

In this description, the modifier "transmitting" is used to modify the term "computing system" to represent that the transmitting computing system sounds the audio signal, and the modifier "receiving" is used to modify the term "computing system" to represent that the receiving computing system hears the audio signal. This is due to the importance of the audio signal to the principles described herein. The transmitting computing system can receive and transmit network communications and perform other logic, while the receiving computing system can receive and transmit network communications and perform other logic.

FIG. 1 illustrates a network environment 100 in which the principles described herein may be employed. The network environment 100 includes a transmitting computing system 110 and receiving computing systems 120. Although the receiving computing systems 120 are illustrated as including three receiving computing systems 121, 122 and 123, the ellipsis 124 represents that there may be any whole number (one or more) of receiving computing systems 120 within the network environment 100. In the illustrated example, the transmitting computing system 110 has a user (identified as "user T"), and each of the receiving computing systems 120 also has a respective user (identified as "user R1" for receiving computing system 121, "user R2" for receiving computing system 122, and "user R3" for receiving computing system 123).

The receiving computing systems 120 are within such close proximity with the transmitting computing system 110 such that the receiving computing systems 120 can each hear (via a microphone) an audio signal that is sounded (via a speaker) by the transmitting computing system. For instance, the transmitting computing system 110 includes a speaker 111 that emits an audio signal 101 that may be received by a microphone 126 of the receiving computing system 121. Similarly, the audio signal 101 may likewise be received by microphones (not shown) of any other of the receiving computing systems 120. For instance, the receiving computing systems 120 may be in the same room as the transmitting computing system 110. The transmitting computing system 110 and the receiving computing systems 120 may each be portable computing systems, and may be structured as described below for the computing system 700 of FIG. 7.

In one embodiment, the audio signal 101 is at least partially in the audible range of 20 hertz (Hz) to 20 kilohertz (kHz). This allows the users of the transmitting and receiving computing systems to use their own hearing to detect that the audio signal has been sent. Thus, the users know that access will soon be granted to the resource. In other embodiments, some or all of the audio signal may be outside of the audible range (e.g., below 20 Hz and/or above 20 kHz).

In accordance with the principles described herein, the network environment 100 also includes a resource server computing system 130 that regulates access to a number of resources 140. As an example, FIG. 1 illustrates that the resources 140 includes four resources 141, 142, 143 and 144. However, the ellipsis 145 represents that the resource server computing system 130 may manage any number of resources. The resource server computing system 130 may be structured as described below for the computing system 700 of FIG. 7.

In one embodiment, there is a distinct audio signal that is used to grant access to each of the resources 140. Thus, the receipt of one audio signal may allow the receiving computing system access to resource 141, the receipt of another audio signal may allow the receiving computing system access to resource 142, the receipt of a third audio signal may allow the receiving computing system access to resource 143, and the receipt of a fourth audio signal may allow the receiving computing system access to resource 144.

The resources 140 might each be a hardware resource, data, code, an account, a workspace, or any other resource. Examples of hardware resources include a storage drive or an output device (such as a printer or display). Examples of data might be a credential, configuration settings, a database, media (such as images, video, audio, or the like), a mapping or pointer to other resources (such as a virtual drive), or any other data. Examples of code include software or a web service. An example of an account might be a cloud storage account, an e-mail account, or any other account. An example of a workspace might be an online meeting, or membership in an electronic collaboration account having at least one modality of communication between users. The resource may also be membership in a group, such that accessing the resource includes joining a user into the group. As an example, the group might be an online meeting, an electronic collaboration account, a mailing list, a social media group, a chat session, a game, or any other group.

The principles described herein allow a user of one computing system to share access to a resource to other users of respective receiving computing systems by transmitting an audio signal to those receiving computing systems. As an example used throughout this description, suppose that the user T of transmitting computing system 110 owns resource 141 in the sense that the user T has a right to permit at least partial access to the resource 141 to other users, at least under some circumstances. In this example, user T will share access to the resource 141 with users R1 through R3 by sounding the audio signal 101 to the respective receiving computing systems 121 through 123.

Figure 2:
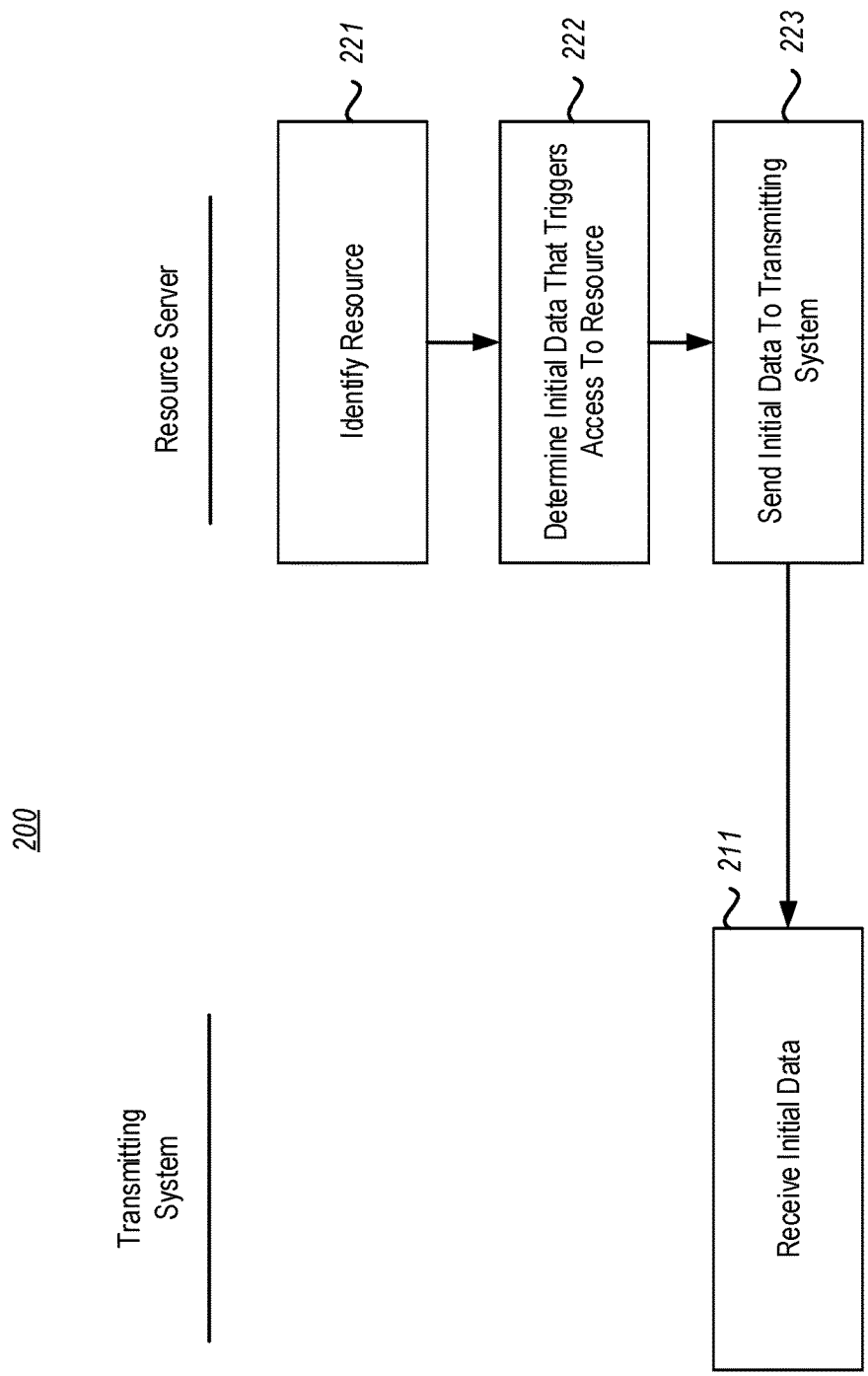
FIG. 2 illustrates a flowchart of a first method for the transmitting computing system and the resource server computing system performing preliminary coordination, which may be in preparation for performing the method of FIG. 4.

FIG. 2 illustrates a flowchart of a first method 200 for the transmitting computing system that transmits the audio signal (e.g., transmitting computing system 110 in FIG. 1) and the resource server computing system that regulates access to the resource (e.g., resource server computing system 130 in FIG. 1) performing preliminary coordination. This preliminary coordination is in preparation for the transmitting computing system sounding an audio signal to receiving computing systems whose users are to be granted access to a resource. Acts performed by the transmitting computing system that is to sound the audio signal (e.g., transmitting computing system 110 in FIG. 1) are listed in the left column of FIG. 2 under the heading "Transmitting System". Acts performed by the resource server computing system that manages the resource (e.g., resource server computing system 130 in FIG. 1) are listed in the right column of FIG. 2 under the heading "Resource Server".

In this first method 200, the resource server computing system defines initial data that corresponds to access data to be provided by the receiving computing system that receives the audio signal (e.g., receiving computing system 121 in FIG. 1) to the resource server computing system in order to be granted access to the resource (e.g., resource 141 in FIG. 1). The method 200 will be described with respect to FIG. 1, and with particular reference to arrow 151A in which the resource server computing system 130 transmits initial data to the transmitting computing system 110.

The resource server computing system first identifies which resource the transmitting computing system is to grant access to (act 221). Referring to FIG. 1, suppose that the resource server computing system 130 determines that the transmitting computing system 110 (or its user T) wishes to grant access to resource 141. As an example, the transmitting computing system 110 itself may have sent to the resource server computing system 130 a request to grant access to resource 141. Upon verifying that the user T or its computing system 110 is authorized to grant such access, the resource server computing system 130 may identify resource 141 as the resource to which access is to be granted.

The resource server computing system then defines or determines initial data that will trigger access to the identified resource (act 222). This initial data is structured such that, when interpreted by the transmitting computing system, the transmitting computing system is caused to generate and sound an audio signal that corresponds to the resource to which access is to be granted. This resource server computing system then sends this initial data to the transmitting computing system that is to sound the audio signal (act 223), whereupon that initial data is received by the transmitting computing system that is to sound the audio signal (act 211). Referring to FIG. 1, suppose that the resource server computing system 130 sends initial data corresponding to the resource 141 to the transmitting computing system 110, as represented by arrow 151A.

This initial data might be a direct digital representation of the audio signal (e.g., audio signal 101) that is to be sounded from the transmitting computing system (e.g., transmitting computing system 110) to the receiving computing systems (e.g., receiving computing systems 120). Alternatively, this initial data may be data that the transmitting computing system may use to derive the audio signal that is to be sounded. For instance, suppose that the initial data might be binary 00 to trigger access to resource 141, binary 01 to trigger access to resource 142, binary 10 to trigger access to resource 143, and binary 11 to trigger access to resource 144. In that case, initial data of 00 might cause the transmitting computing system to look up a digital representation of an audio signal that may be used to access resource 141, initial data of 01 might cause the transmitting computing system to look up a digital representation of another audio signal that may be used to access resource 142, and so forth.

Figure 3:
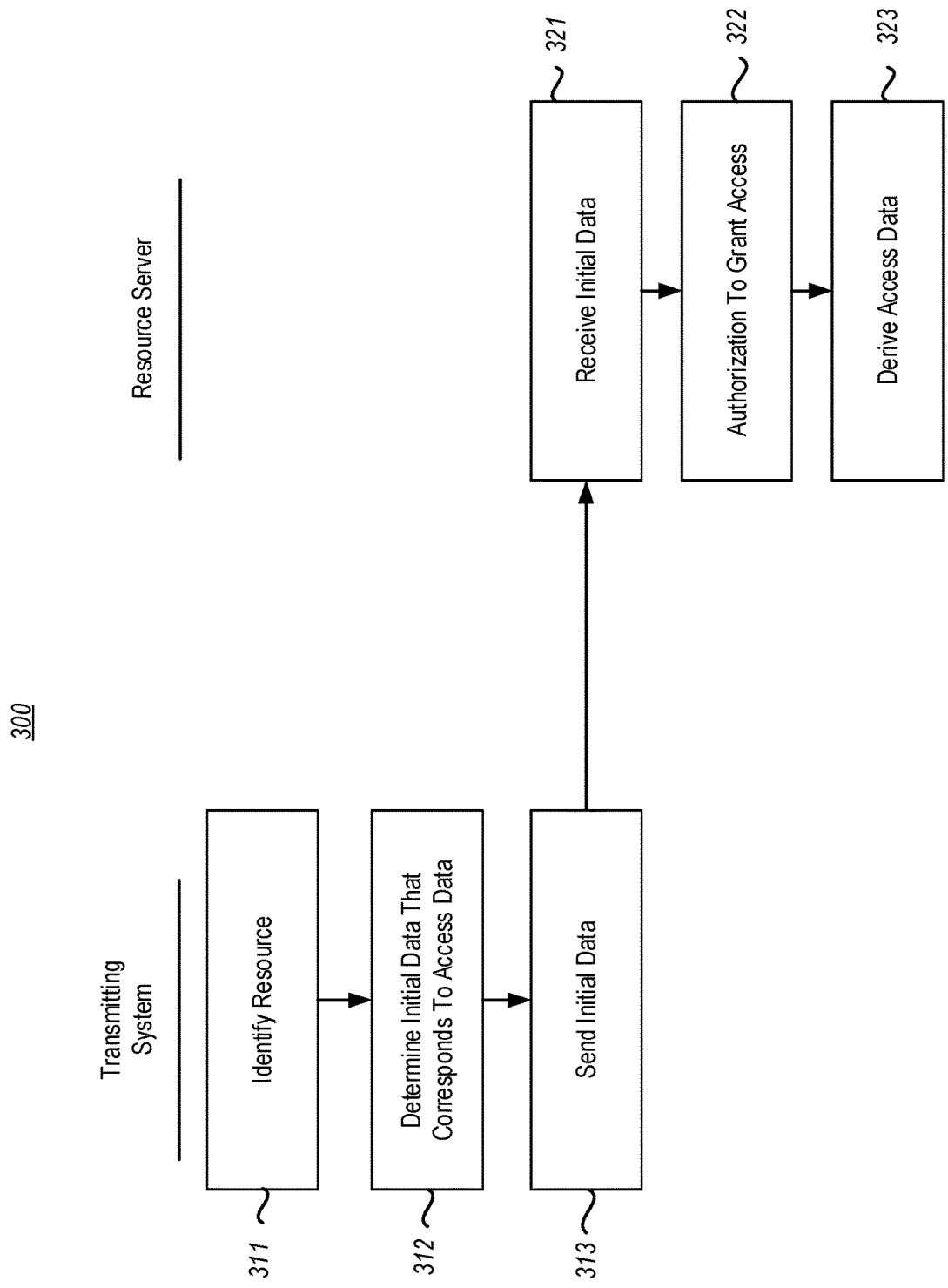
FIG. 3 illustrates a flowchart of a second method for the transmitting computing system and the resource server computing system performing preliminary coordination, which may be in preparation for performing the method of FIG. 4.

FIG. 3 illustrates a flowchart of a second method 300 for the transmitting computing system that transmits the audio signal (e.g., transmitting computing system 110 in FIG. 1) and the resource server computing system that regulates access to the resource (e.g., resource server computing system 130 in FIG. 1) performing preliminary coordination. In this second method 300, the transmitting computing system that is to sound an audio signal defines initial data that corresponds to access data to be provided by the receiving computing system that receives the audio signal (e.g., receiving computing system 121 in FIG. 1) to the resource server computing system in order to be granted access to the resource (e.g., resource 141 in FIG. 1). The method 300 will be described with respect to FIG. 1, and with particular reference to arrow 151B in which the transmitting computing system 110 transmits the initial data to the resource server computing system 130.

The transmitting computing system first identifies which resource the transmitting computing system is to grant access to (act 311). Referring to FIG. 1, suppose that the transmitting computing system 110 (or its user T) is to grant access to resource 141.

The transmitting computing system then defines or determines initial data that corresponds to access data that will permit access to the identified resource (act 312). This initial data is structured such that, when interpreted by the resource server computing system, the resource server computing system is caused to determine the access data that may be used to permit access to the identified resource. The transmitting computing system then sends this initial data to the resource server computing system (act 313), whereupon that initial data is received by the resource server computing system (act 321). Referring to FIG. 1, suppose that the transmitting computing system 110 sends initial data corresponding to the access data for the resource 141 to the resource server computing system 130, as represented by arrow 151B.

The resource server computing system verifies that the user T or its computing system 110 is authorized to grant such access to the resource (act 322), and derives access data from the initial data (act 323). This initial data might be the access data itself that is to be provided by the receiving computing systems (e.g., receiving computing system 121) in order to access the resource (e.g., resource 141). In that case, the deriving of the access data from the initial data (act 323) is a trivial process. Alternatively, this initial data may be different than the access data requiring the resource server computing system to perform some processing to determine the access data to be used to access the resource.

Figure 4:
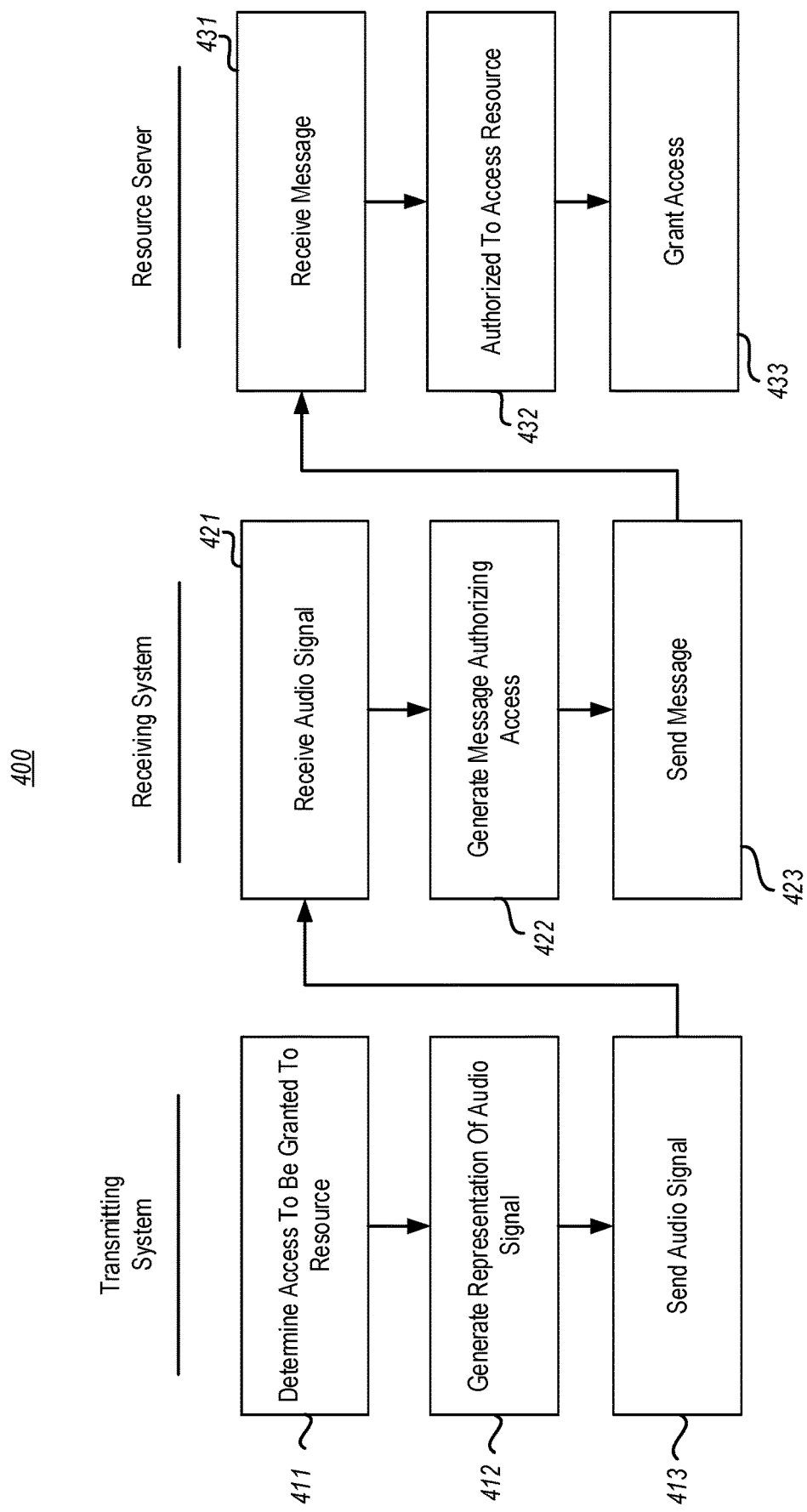
FIG. 4 illustrates a flowchart of a method for using an audio signal to grant a user of the computing system access to a resource, in accordance with the principles described herein.

FIG. 4 illustrates a flowchart of a method 400 for using an audio signal to grant a user of the computing system access to a resource, in accordance with the principles described herein. Acts that are performed by a transmitting computing system that sounds the audio signal (e.g., transmitting computing system 110 in FIG. 1) are represented in the left column of FIG. 4 under the heading "Transmitting System". Acts that are performed by a receiving computing system that receives the audio signal (e.g., receiving computing system 121 in FIG. 1) are presented in the middle column of FIG. 4 under the heading "Receiving System". Acts that are performed by the resource server computing system that regulates access to the resource (e.g., resource server computing system 130 in FIG. 1) are presented in the right column of FIG. 4 under the heading "Resource Server".

The transmitting computing system determines that a resource is to be granted to others (act 411). For instance, in FIG. 1, the transmitting computing system 110 may determine that access to resource 141 is to be granted. In the context of FIG. 3, this may cause the transmitting computing system 110 to send the initial data to the resource server computing system 130 (see arrow 151B), which may be used to determine which resource to grant to a receiving computing system upon that receiving computing system presenting access data for that resource.

The transmitting computing system then formulates a representation of an audio signal that corresponds to access to the resource (act 412). For instance, in the case of the method 200 of FIG. 2, the transmitting computing system 110 might generate an audio signal corresponding to the initial data provided (see arrow 151A of FIG. 1) by the resource server computing system 130.

If that initial data were an actual representation of the audio signal itself, this generation would be a trivial process of simply reading that initial data. If that initial data were some other initial data that the transmitting computing system may use to derive the audio signal, the transmitting computing system 110 then derives the audio signal. For instance, there might be four possible audio signals, each corresponding to a different resource 141 through 144. In that case, the initial data might be as short as two bits, that the transmitting computing system may use to look up the appropriate audio signal representation.

The audio signal is structured so as to be interpretable by a receiving computing system as input to generate access data. The receiving computing system may then use that access data to acquire access to the resource. More regarding this process will be described further below.

The transmitting computing system then causes its speaker to emit the audio signal (act 413). For instance, in FIG. 1, the transmitting computing system 110 causes the speaker 111 to emit the audio signal 101. The receiving computing system(s) then receive the audio signal from its microphone (act 421). For instance, in FIG. 1, the receiving computing systems 120 each receive the audio signal 101 at their respective microphones. As illustrated for receiving computing system 121, the receiving computing system 121 receives the audio signal 101 at its microphone 126.

In response to receiving the audio signal from its microphone, the receiving computing system formulates a message that is structured to represent to a resource server computing system that the receiving computing system has received the audio signal (act 422). In one embodiment, this representation is in the form of an access code that the resource server computing system recognizes as authorizing access to the respective resource.

Figure 5:
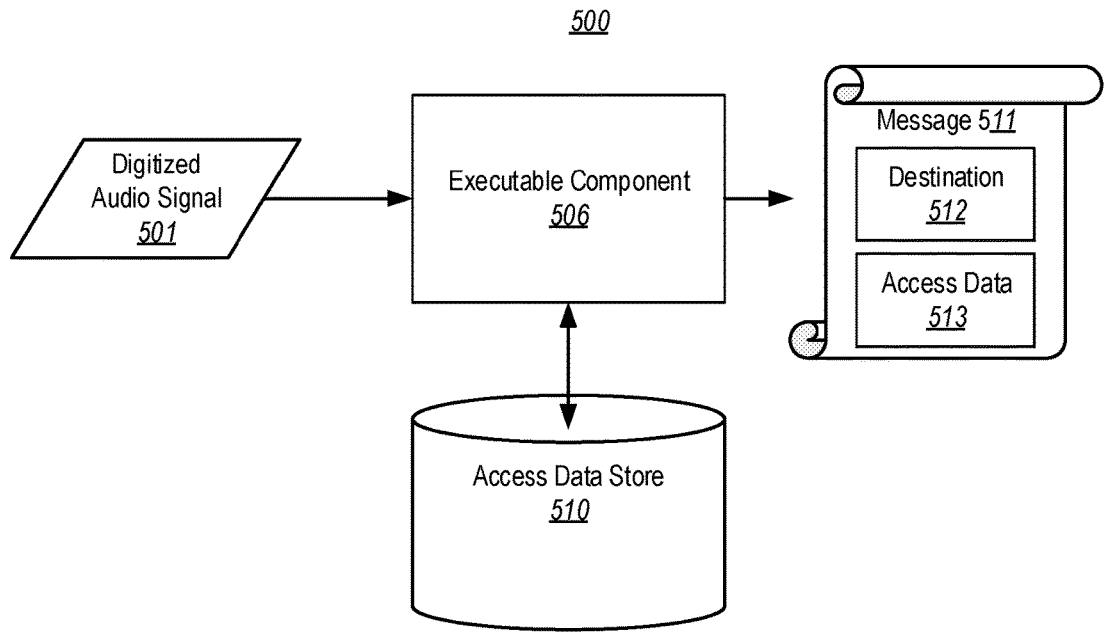
FIG. 5 illustrates a dataflow in which an executable component formulates a message that includes a destination address and access data, which may be executed on the receiving computing system.

To illustrate, FIG. 5 illustrates a dataflow 500 in which an executable component 506 formulates a message 511 that includes a destination address 512 and access data 513. The executable component 506 formulates the message 511 using the digitized audio signal 501 received from the microphone of the receiving computing system. The executable component 506 may be present on each of the receiving computing systems 120 of FIG. 1, and may be structured as described below for the executable component 706.

In one embodiment, the executable component 506 is an integral part of the operating system of the receiving computing system. In another embodiment, the executable component 506 is an application that runs on the receiving computing system. In the latter case, the user T of the transmitting computing system might ask the users R1 through R3 to open that application on their respective receiving computing systems. In either case, if the microphone is not already enabled on each of the receiving computing systems, the user T might ask the users R1 to R3 to enable their microphone.

In one embodiment, the executable component 506 uses a matching function to match the received digitized audio signal against digital audio signals stored in an access data store 510. There will be some degradation of the received digitized audio signal as compared to the transmitted digitized audio signal due to limitations in the speaker of the transmitting computing system and in the microphone of the receiving computing system, and due to properties (e.g., echo, filtering, noise, and so forth) of the channel between the speaker and microphone. Nevertheless, a matching function will be able to account for normal variance to identify which audio signal was transmitted.

Based on the identity of this audio signal, the executable component 506 then determines the access data corresponding to that audio signal (and thus corresponding to the resource to be accessed). Thus, the executable component 506 may populate the message 511 with the access data 513. The access data 513 is structured to be interpretable by the resource server computing system as authorizing access to the resource. After all, the ability to generate the access data 513 evidences receipt of the audio signal.

The destination field 512 of the message 511 is the address of the resource server computing system (e.g., resource server computing system 130 in FIG. 1). In one embodiment, the destination field 512 is predetermined for each executable component 506. For instance, one application might be dedicated to listening for audio signals that allow access to resources to which access is regulated by only a single resource server computing system. On the other end of the spectrum, the destination field 512 may depend on the identifier of the audio signal itself. Thus, the identity of the resource server computing system may be at the same granularity as the identity of the audio signal.

The receiving computing system then transmits the message to the resource server computing system (act 423). For instance, referring to FIG. 1, each of the computing systems 120 may receive the audio signal (in act 421), generate the message (in act 422), and send the message to the resource server computing system (act 423). This sending is represented by arrow 152 in FIG. 1. The resource server computing system then receives each message (act 431).

Upon detecting such receipt, the resource server computing system interprets the message as representing that the receiving computing system received an audio signal or more generally is authorized to access the resource (act 432). For instance, if the message includes access data, that access data is compared against access data that would permit access to the resource. That access data might be a digital representation of the audio signal itself. Alternatively, the access data might be the same value as the initial data that was provided to the transmitting computing system in method 200 of FIG. 2, or that was provided to the resource server computing system in the method 300 of FIG. 3. In any case, that access data correlates to the audio signal received by the receiving computing system, and the receiving computing system offering that access data evidences that the receiving computing system indeed did hear the audio signal.

The resource computing system then grants the receiving computing systems (or its user) access to the resource (act 433). For instance, in FIG. 1, the receiving computing systems 120 are each granted access to the resource 141 that is owned by the user T of the transmitting computing system 110.

Figure 6:
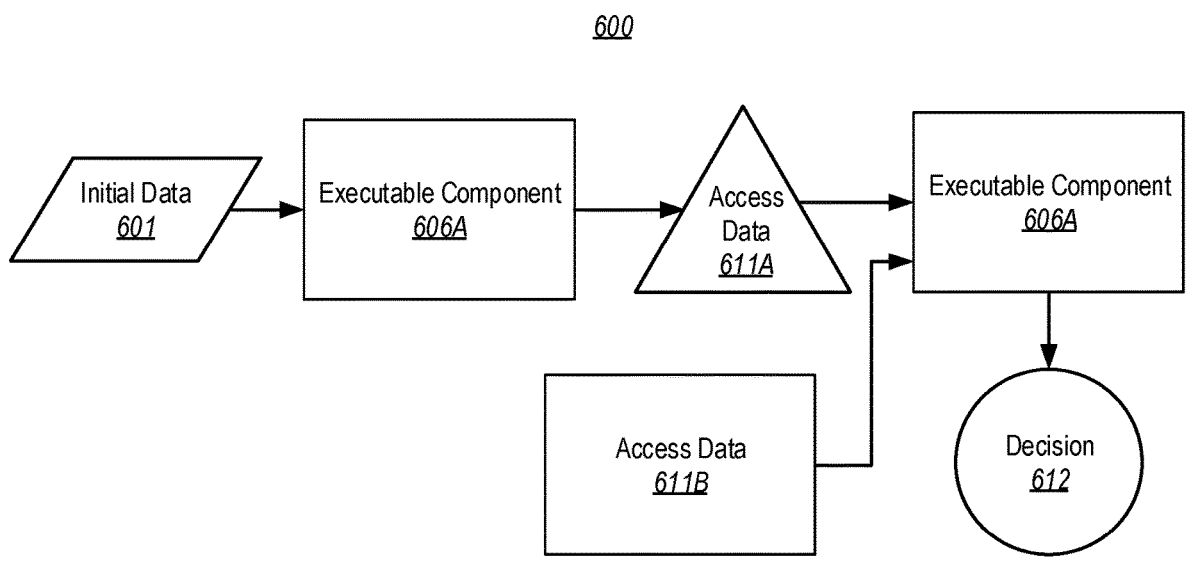
FIG. 6 illustrates several dataflows that operate on the resource server computing system in order to determine whether to grant access to a resource, in accordance with the principles described herein.

FIG. 6 illustrates several dataflows 600 that operate on the resource server computing system in order to determine whether to grant access to a resource. As described above with respect to FIGS. 2 and 3, the transmitting computing system and the resource server computing system perform preliminary coordination, which results in the resource server computing system having initial data. This initial data is represented in FIG. 6 by initial data 601.

An executable component 606A interprets the initial data 601 to thereby obtain access data 611A In addition, the other access data 611B represents access data received from a receiving computing system and may be, for instance, the access data 513 (see FIG. 5) within the message 511 received from any of the receiving computing systems 120. An executable component 606B compares the access data 611A with the access data 611B received from the receiving computing system, and issues a decision 612 on whether or not to grant access to the corresponding resource. If the access data 611A is correlated with the access data 611B (e.g., are the same, or are mappable to each other), then the decision 612 is to grant access to the resource. Each of the executable components 606A and 606B may be structured as described below for the executable component 706 of the computer system 700.

The method 400 may be performed in order to grant initial access to a resource. Alternatively, or in addition, the method 400 may be used to renew access previously granted to a resource. For instance, access to a resource might initially have some expiration time, with the method 400 being performed prior to that expiration in order to extend that expiration time.

Accordingly, the principles described herein permit access to resources using a sound signal. As the principles described herein may be enabled via the use of computing systems, an example computing system will now be described with respect to FIG. 7. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
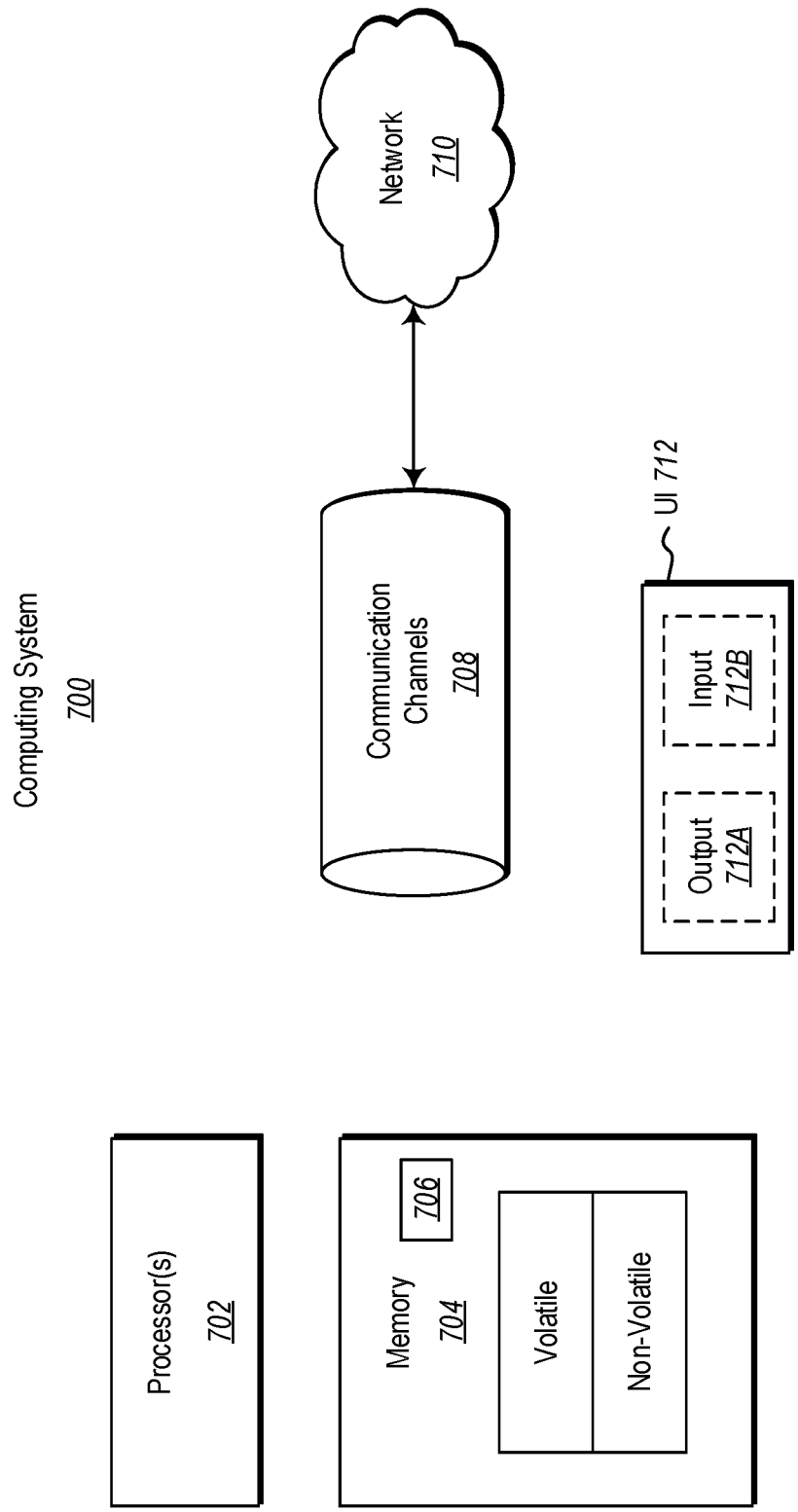
FIG. 7 illustrates an example computer system in which the principles described herein may be employed.

As illustrated in FIG. 7, in its most basic configuration, a computing system 700 typically includes at least one hardware processing unit 702 and memory 704. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface 712 for use in interfacing with a user. The user interface 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, virtual reality, and so forth. Examples of input mechanisms 712B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A resource server computing system comprising:
   one or more hardware processors; and
   one or more hardware storage devices having thereon computer-executable instructions that are structured such that, when executed by the one or more processors, cause the computing system to perform a method for granting a user access to a resource, the method comprising:
   providing a binary value to a transmitting computing system causing the transmitting computing system to look up a digital signal representation of an audio signal used to access a resource;
   detecting receipt of a message from a receiving and requesting client computing system, the message being structured to represent to the resource server computing system that the receiving and requesting client computing system has received the audio signal from the transmitting computing system, the audio signal having been selected by the transmitting computing system based on the binary value associated with the audio signal, wherein a user of the receiving and requesting client computing system is to be granted access to a resource, by at least using a matching function to identify access data that is stored at an access data store of the receiving and requesting client computing system prior to receiving the audio signal, as a result of the receiving and requesting client computing system receiving the audio signal, and further wherein the message is automatically generated in response to the receiving and requesting client computing system receiving the audio signal from the transmitting computing system;
   interpreting the message as representing that the receiving and requesting client computing system received the audio signal from the transmitting computing system that maps to the access data stored at the access data store on the receiving and requesting client computing system prior to the receiving and requesting client computing system receiving the audio signal; and
   in response to interpreting the message, granting a user of the receiving and requesting client computing system access to a resource.

2. The computing system in accordance with claim 1, the resource comprising an online meeting.

3. The computing system in accordance with claim 1, the resource comprising membership in an electronic collaboration account having at least one mode of communication between a plurality of users.

4. The computing system in accordance with claim 1, the resource comprising a hardware resource.

5. The computing system in accordance with claim 4, the hardware resource comprising an output device.

6. The computing system in accordance with claim 5, the output device comprising a printer.

7. The computing system in accordance with claim 1, the resource comprising a drive.

8. The computing system in accordance with claim 1, the resource comprising a credential.

9. The computing system in accordance with claim 1, the resource comprising a web service.

10. The computing system in accordance with claim 1, the resource comprising data.

11. The computing system in accordance with claim 1, the resource comprising one or more configuration settings.

12. The computing system in accordance with claim 1, the resource comprising software.

13. The computing system in accordance with claim 1, the method further comprising: interpreting the message as further representing that the user of the receiving and requesting client computing system is operating the receiving and requesting client computing system.

14. A method fora resource server computing system to grant a user access to a resource, the method comprising:
   providing a binary value to a transmitting computing system for causing the transmitting computing system to look up a digital signal representation of an audio signal used to access a resource;
   detecting receipt of a message from a receiving and requesting client computing system, the message being structured to represent to the resource server computing system that the receiving and requesting client computing system has received the audio signal from the transmitting computing system, the audio signal having been selected by the transmitting computing system based on the binary value associated with the audio signal, wherein a user of the receiving and requesting client computing system is to be granted access to the resource, by at least using a matching function to identify access data that is stored at an access data store of the receiving and requesting client computing system prior to receiving the audio signal, as a result of the receiving and requesting client computing system receiving the audio signal, and further wherein the message is automatically generated in response to the receiving and requesting client computing system receiving the audio signal from the transmitting computing system;
   interpreting the message as representing that the receiving and requesting client computing system received the audio signal from the transmitting computing system that maps to the access data stored at the access data store on the receiving and requesting client computing system prior to the receiving and requesting client computing system receiving the audio signal; and
   in response to interpreting the message, granting a user of the receiving and requesting client computing system access to a resource.

15. The method in accordance with claim 14, the resource comprising an online meeting.

16. The method in accordance with claim 14, the resource comprising membership in an electronic collaboration account having at least one mode of communication between a plurality of users.

17. The method in accordance with claim 14, the resource comprising a hardware resource.

18. The method in accordance with claim 14, the resource comprising software or a web service.

19. The method in accordance with claim 14, the method further comprising: interpreting the message as further representing that the user of the receiving and requesting client computing system is operating the receiving and requesting client computing system.

20. A computer program product comprising one or more hardware storage devices having thereon computer-executable instructions that are executable by one or more processors of a resource server computing system to configure the resource server computing system to perform the following:

provide a binary value to a transmitting computing system for causing the transmitting computing system to look up a digital signal representation of an audio signal used to access a resource;

detect receipt of a message from a receiving and requesting client computing system, the message being structured to represent to the resource server computing system that the receiving and requesting client computing system has received the audio signal from the transmitting computing system, the audio signal having been selected by the transmitting computing system based on the binary value associated with the audio signal, wherein a user of the receiving and requesting client computing system is to be granted access to the resource, by at least using a matching function to identify access data that is stored at an access data store of the receiving and requesting client computing system prior to receiving the audio signal, as a result of the receiving and requesting client computing system receiving the audio signal, and further wherein the message is automatically generated in response to the receiving and requesting client computing system receiving the audio signal from the transmitting computing system;

interpret the message as representing that the receiving and requesting client computing system received the audio signal from the transmitting computing system that maps to the access data stored at the access data store on the receiving and requesting client computing system prior to the receiving and requesting client computing system receiving the audio signal; and in response to interpreting the message, grant a user of the receiving and requesting client computing system access to a resource.

* * * * *